United States Patent
Zhao et al.

(10) Patent No.: US 10,793,124 B2
(45) Date of Patent: Oct. 6, 2020

(54) VEHICLE WHEEL TORQUE CONTROL SYSTEMS AND METHODS

(71) Applicant: FORD GLOBAL TECHNOLOGIES, LLC, Dearborn, MI (US)

(72) Inventors: Yanan Zhao, Ann Arbor, MI (US); Ming Lang Kuang, Canton, MI (US); Walter Joseph Ortmann, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 167 days.

(21) Appl. No.: 15/914,161

(22) Filed: Mar. 7, 2018

(65) Prior Publication Data

US 2019/0275994 A1  Sep. 12, 2019

(51) Int. Cl.
  *B60T 8/1755* (2006.01)
  *B60T 7/00* (2006.01)
  (Continued)

(52) U.S. Cl.
  CPC .......... *B60T 8/1755* (2013.01); *B60K 7/0007* (2013.01); *B60L 7/18* (2013.01); *B60L 58/12* (2019.02); *B60T 8/1769* (2013.01); *B60K 6/20* (2013.01); *B60T 2250/03* (2013.01); *B60T 2270/30* (2013.01); *B60T 2270/613* (2013.01); *Y10S 903/947* (2013.01)

(58) Field of Classification Search
  CPC ........ B60K 23/08; B60K 7/00; B60K 7/0007; B60K 17/354; B60K 5/02; B60K 6/20; B60L 15/20; B60L 3/108; B60L 7/18; B60L 58/12; B60L 7/24; B60L 7/26; B60L 2240/465; B60W 30/045; B60W 30/02; B60W 10/08; B60W 2520/26; B60W 20/00; B60W 30/18127; B60T 8/267; B60T 8/1761
  See application file for complete search history.

(56) References Cited

U.S. PATENT DOCUMENTS 5,511,859 A * 4/1996 Kade ................... B60W 20/13
                                                          303/3
5,839,800 A * 11/1998 Koga ..................... B60K 6/46
                                                          303/152

(Continued)

FOREIGN PATENT DOCUMENTS

WO       2014162830 A1    2/2017

OTHER PUBLICATIONS

Brian McKay, Ph. D, Powertrain Technology & Innovation, Benefits of 48V P2 Mild Hybrid, Continental AG, Sep. 30, 2016, 20 Pages.

*Primary Examiner* — Mussa A Shaawat
(74) *Attorney, Agent, or Firm* — David Kelley; Brooks Kushman, P.C.

(57) ABSTRACT

A vehicle includes a pair of electric machines each coupled to a laterally-opposing wheel to output a wheel torque. The vehicle also includes a controller programmed to command a combined regenerative braking torque output of the electric machines based on a lesser of a braking torque limit of each individual electric machine. The controller is also programmed to command a regenerative braking torque from each electric machine to be within a predetermined torque threshold of each other in response to a yaw rate exceeding a yaw threshold.

20 Claims, 3 Drawing Sheets

(51) Int. Cl.
  *B60L 7/18* (2006.01)
  *B60T 8/1769* (2006.01)
  *B60K 7/00* (2006.01)
  *B60L 58/12* (2019.01)
  *B60K 6/20* (2007.10)

(56) References Cited

U.S. PATENT DOCUMENTS

| | | | | |
|---|---|---|---|---|
| 5,967,621 A * | 10/1999 | Ito | ............. | B60T 8/00 |
| | | | | 303/15 |
| 6,325,470 B1 * | 12/2001 | Schneider | ............. | B60K 1/00 |
| | | | | 303/152 |
| 6,543,565 B1 * | 4/2003 | Phillips | ............. | B60K 6/48 |
| | | | | 180/165 |
| 6,691,013 B1 * | 2/2004 | Brown | ............. | B60K 6/44 |
| | | | | 701/70 |
| 8,040,084 B2 | 10/2011 | Muta | | |
| 8,061,464 B2 * | 11/2011 | Boesch | ............. | B60K 6/365 |
| | | | | 180/197 |
| 8,437,937 B2 * | 5/2013 | Ganley | ............. | B60T 1/10 |
| | | | | 303/152 |
| 9,186,989 B2 | 11/2015 | Hashimoto et al. | | |
| 9,246,417 B1 * | 1/2016 | Connolly | ............. | B60K 6/48 |
| 9,352,744 B2 | 5/2016 | Zhao et al. | | |
| 2003/0136597 A1 * | 7/2003 | Raftari | ............. | B60K 6/52 |
| | | | | 180/242 |
| 2003/0169002 A1 * | 9/2003 | Hughes | ............. | B60L 7/12 |
| | | | | 318/376 |
| 2004/0046448 A1 * | 3/2004 | Brown | ............. | B60W 30/02 |
| | | | | 303/152 |
| 2005/0143877 A1 * | 6/2005 | Cikanek | ............. | B60L 3/106 |
| | | | | 701/22 |
| 2008/0017428 A1 * | 1/2008 | Masterson | ............. | B60L 15/2009 |
| | | | | 180/65.31 |
| 2010/0113215 A1 * | 5/2010 | Jager | ............. | B60W 30/18172 |
| | | | | 477/29 |
| 2013/0169032 A1 * | 7/2013 | Linhoff | ............. | B60L 7/26 |
| | | | | 303/3 |
| 2013/0173099 A1 * | 7/2013 | Takagi | ............. | B60W 10/08 |
| | | | | 701/22 |
| 2013/0289809 A1 * | 10/2013 | Treharne | ............. | B60L 1/02 |
| | | | | 701/22 |
| 2014/0257664 A1 * | 9/2014 | Arbitmann | ............. | B60L 7/26 |
| | | | | 701/71 |
| 2015/0105951 A1 * | 4/2015 | Yu | ............. | B60L 58/14 |
| | | | | 701/22 |
| 2015/0203106 A1 * | 7/2015 | Zhao | ............. | B60L 7/18 |
| | | | | 701/22 |
| 2016/0185228 A1 * | 6/2016 | Riedel | ............. | B60L 3/108 |
| | | | | 701/78 |
| 2016/0362020 A1 | 12/2016 | Shepley et al. | | |
| 2017/0232849 A1 * | 8/2017 | Yamamoto | ............. | B60T 8/267 |
| | | | | 303/15 |
| 2018/0180011 A1 * | 6/2018 | Stalfors | ............. | B60K 6/38 |
| 2018/0244257 A1 * | 8/2018 | Kneitz | ............. | B60W 10/08 |
| 2018/0257634 A1 * | 9/2018 | Zhao | ............. | B60K 6/485 |
| 2018/0361856 A1 * | 12/2018 | Zhao | ............. | B60W 10/08 |
| 2019/0193568 A1 * | 6/2019 | Cho | ............. | B60L 3/108 |

* cited by examiner

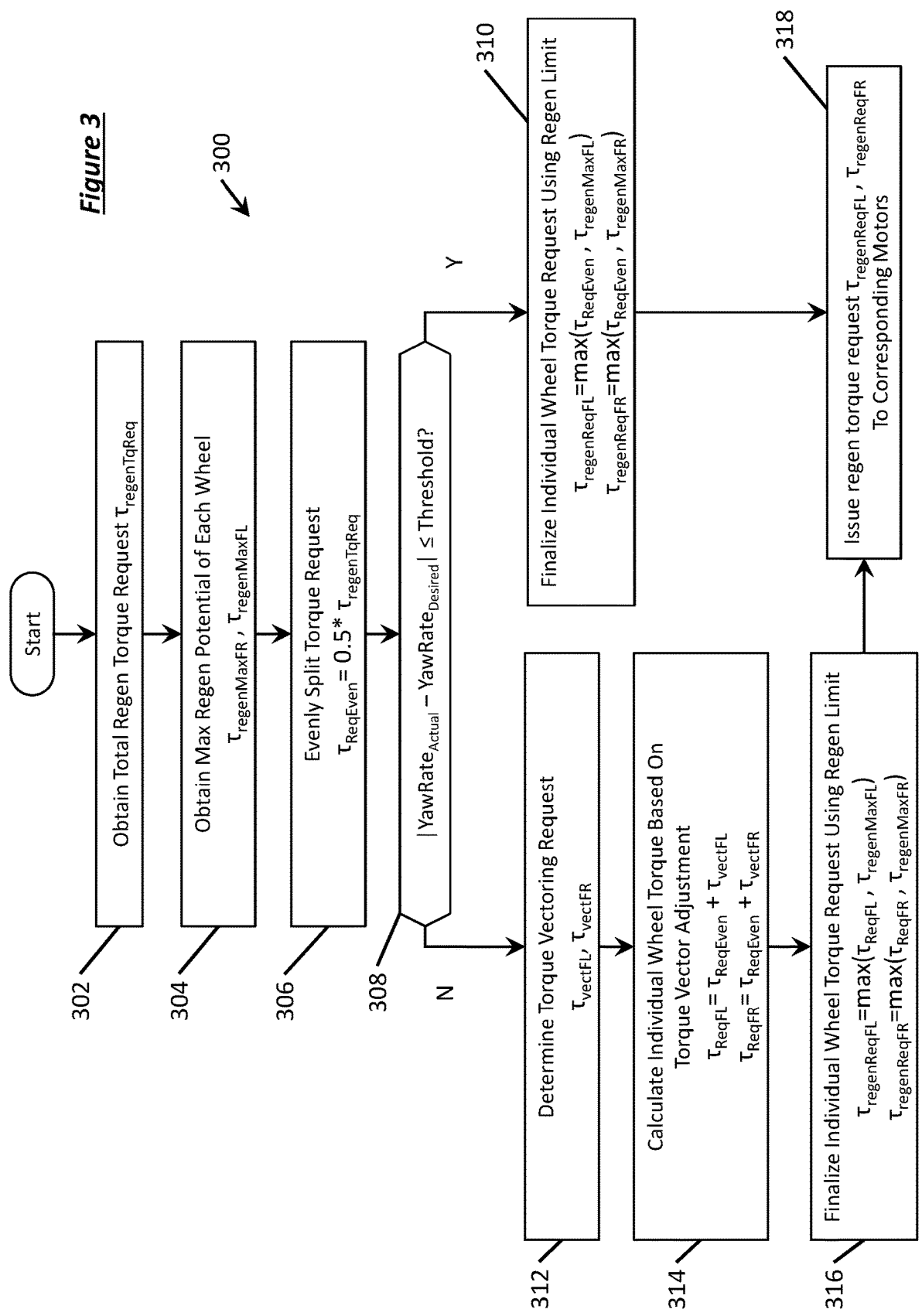

VEHICLE WHEEL TORQUE CONTROL SYSTEMS AND METHODS

TECHNICAL FIELD

The present disclosure relates to vehicle regenerative braking systems having independent torque control of individual wheels.

BACKGROUND

Electrified vehicles having an electric machine for vehicle propulsion may have the ability to operate the electric machine as a generator during regenerative braking to recover energy and aid in vehicle deceleration. Some regenerative braking control strategies are designed assuming a single electric machine couple to a driven axle to be used for regenerative braking. In such cases a regenerative braking torque request may be based on the capability of a single motor. Additionally, vehicle braking stability limits may similarly be based on the braking torque applied to the driven axle.

SUMMARY

A vehicle includes a pair of electric machines each coupled to a laterally-opposing wheel to output a wheel torque. The vehicle also includes a controller programmed to command a combined regenerative braking torque output of the electric machines based on a lesser of a braking torque limit of each individual electric machine. The controller is also programmed to command a regenerative braking torque from each electric machine to be within a predetermined torque threshold of each other in response to a yaw rate exceeding a yaw threshold.

A method of controlling regenerative braking includes applying a combined regenerative braking torque output for each of a first wheel and a second opposing wheel that is equal to about two times a lesser individual regenerative torque capability limit of the first wheel and the second laterally-opposing wheel, wherein the individual regenerative torque capability limit is based on the lesser of a wheel slip torque limit and an electric machine regenerative torque capability limit.

A vehicle regenerative braking system includes a pair of electric machines each coupled to a laterally-opposing vehicle wheel to control wheel torque. The regenerative braking system also includes a controller programmed to command a combined regenerative braking torque output at the wheels equal to about two times a torque capability corresponding to a lesser torque-capable wheel plus a predetermined torque buffer, and command a regenerative braking torque at each wheel to be half of the combined regenerative braking torque plus a torque vector adjustment in response to a vehicle yaw rate greater than a yaw threshold.

BRIEF DESCRIPTION OF THE DRAWINGS

FIG. 3 is an additional method of controlling regenerative braking of a vehicle.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
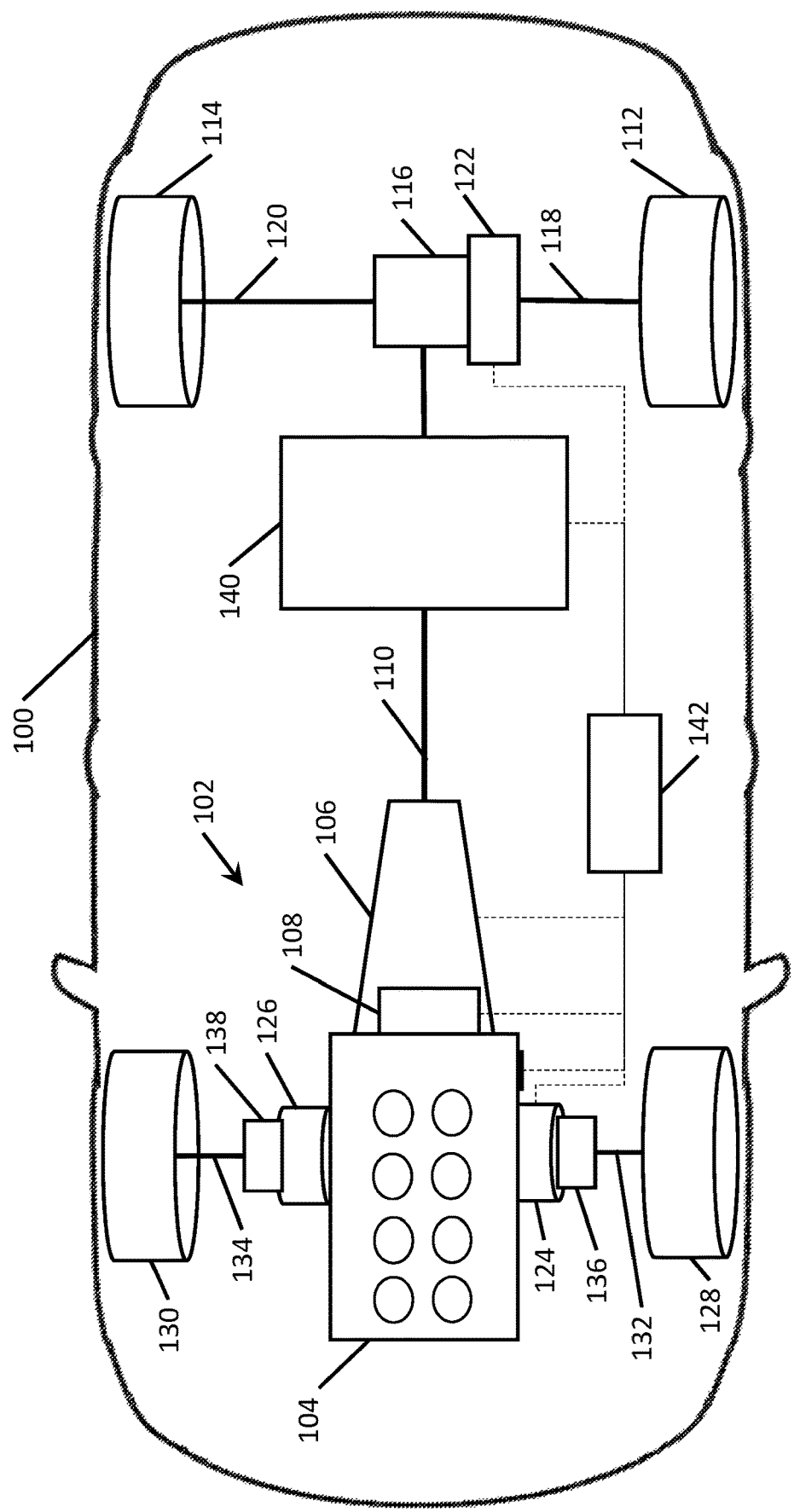
FIG. 1 is a schematic top view of a vehicle.

Referring to FIG. 1, vehicle 100 is schematically depicted. The vehicle 100 includes a propulsion system 102 having an engine 104, such as a diesel or gasoline combustion engine. According to one example, the engine 104 is an 8-cylinder high performance engine. However, it should be appreciated that aspects of the present disclosure may apply to a smaller output engine or to electric-only propulsion system configurations. The propulsion system 102 also includes a transmission 106, such as dual-clutch powershift transmission or another multiple gear ratio type of transmission to transfer torque output from the engine 104 to one or more road wheels. The engine 104 may be started from an inactive state by a supplemental electric machine, such as a crank-integrated starter generator (CISG) 108. Torque output from the engine 104 is passed through the transmission 106 and downstream to a driveline shaft 110 to output torque to rear wheels 112, 114. According to some examples the driveline shaft 110 is coupled to a rear final drive differential 116 to distribute torque between each of a left half shaft 118 and a right half shaft 120 connected to the rear wheels. In further examples, the propulsion system 102 also includes an additional electronic control, such as an electronic limited slip differential (eLSD) module 122 coupled to the differential 116 to further control the apportionment of torque between the right and left rear wheels 112, 114.

The propulsion system 102 also includes a plurality of electrified propulsion sources such as electric machines 124, 126. According to the example of FIG. 1, a pair of electric machines is depicted, each being coupled to a laterally-opposing wheel. A first electric machine 124 is coupled to a left front wheel 128, and a second electric machine 126 is coupled to a right front wheel 130. Each of the electric machines 124, 126 is configured to output torque to the left half shaft 132 and right half shaft 134, respectively. Each half shaft is in turn coupled to a respective front wheel. Also shown in the example of FIG. 1, each of the electric machines is connected to a respective half shaft via an electric front axle drive (EFAD) to regulate torque output from each of the electric machines delivered to the wheels. Each of the EFAD units 136, 138 may be equipped with internal gearing to vary torque output from an electric machine. In further examples, each of the EFAD units may be integrated as part of an electric machine module. Power output by the electric machines 124, 126 drives vehicle wheels 28, 27 through gearing of the respective EFAD's 136, 138.

The electric machines 124, 126 are powered by an electronic storage device, such as a high-voltage traction battery pack 140. Each of the electric machines 124, 126 is capable of selectably operating as a motor or a generator based on the vehicle operating conditions. While operating as motors to output torque to propel the vehicle, power is supplied from the traction battery pack 140 to each electric machine. While operating as generators to recover energy and/or decelerate the vehicle, power is generated at the electric machines and supplied to recharge the battery 140. As discussed in more detail below, each of the electric machines is independently controlled such that the either propulsion torque or regenerative torque may be varied from side to side to influence traction control of the vehicle.

The traction battery pack 140 is configured to supply high-voltage direct current (DC) output via a DC high-voltage bus. One or more contactors may isolate the traction battery 140 from the DC high-voltage bus when opened, and couple the traction battery 140 to the DC high-voltage bus when closed to exchange power. The contactors may be controlled to selectively couple and decouple electrical power flow. The traction battery pack 140 is also electrically coupled to one or more power electronics modules configured to facilitate bi-directionally energy transfer between to the electric machines 124, 126. According to some examples, the traction battery pack 140 may provide a DC output while the electric machines 124, 126 are configured to operate using a three-phase alternating current (AC). The power electronics module may convert the DC power to a three-phase AC power to operate the electric machines. Similarly, in a regenerative operating mode, the power electronics module may convert the three-phase AC output from the electric machines into DC power compatible for storage at the traction battery pack 140. According to some examples, the power electronics module is integrated as part of the traction battery pack 140.

In addition to providing energy for propulsion, the traction battery pack 140 may also provide energy for other low-voltage vehicle electrical systems. The vehicle 100 may include a DC/DC converter module (not shown) that is electrically coupled to the high-voltage bus. The DC/DC converter module may be electrically coupled to a low-voltage bus connected to other vehicle loads. The DC/DC converter module may convert the high-voltage DC output of the traction battery pack 140 to a low-voltage DC supply that is compatible with low-voltage vehicle loads. Such low-voltage load vehicle systems may be electrically coupled to the low-voltage bus.

The propulsion system 102 is configured operate in different propulsion modes including a hybrid drive mode, in which the engine 104 outputs torque, via engagement to the transmission 16 and rear final drive differential 116, to the rear wheels 112, 114. Also during hybrid drive mode, the electric machines 124, 126 are provided electrical power to propel the front wheels 128, 130. The propulsion system is also configured to operate in an engine-only drive mode, in which the engine 104 is engaged with transmission 106 in gear and operated as the sole propulsion source. The propulsion system is further configured to operate in an electric drive mode where the electric machines 124, 126 are powered as the sole propulsion source of the vehicle 100. In electric drive mode the engine may be idled and decoupled from the driveline, or alternatively shut off altogether to preserve fuel. The propulsion system is further configured to operate in a regenerative torque mode to recover energy from existing vehicle motion. The electric machines are controlled to output a regenerative braking torque to a respective wheel to resist rotation. The regenerative torque mode may be engaged while the engine is actively propelling the vehicle to recover energy, for example when the battery 140 exhibits a low battery state of charge (SOC). Regenerative torque mode may also be engaged when is active deceleration is desired, for example during braking conditions.

The various propulsion system components discussed above may have one or more associated controllers to control and monitor the operation of the components. The controllers may communicate via a serial bus (e.g., Controller Area Network (CAN)) or via discrete conductors. A vehicle system controller 142 may be provided to coordinate the operation of the various components. The system controller 142, although represented as a single controller, may be implemented as multiple controllers in cooperation. The controller 142 may include a processor that controls at least some portion of the operation of the controller. The processor allows onboard processing of commands and execution of any number of algorithm routines. The processor may be coupled to memory including non-persistent storage and persistent storage. In an illustrative configuration, the non-persistent storage is random access memory (RAM) and the persistent storage is flash memory. In a general sense, persistent (non-transitory) storage can include all forms of storage that maintain data when a computer or other device is powered down.

The controller 142 is programmed to monitor operating conditions of various vehicle components. At least components such as engine 104, transmission 106, CISG 108, ELSD module 122, and electric machines 124, 126, and battery 140 output signals indicative of operating conditions and receive command signals from controller 142. According to aspects of the present disclosure, the controller 142 is programmed to receive at least: signals representing the start or stopped status of an engine ignition key, signals representing the manually selected position of a PRNDL gear lever selector, signals representing the magnitude of displacement from a reference position of an accelerator pedal, signals representing the magnitude of displacement from a reference position of a brake pedal, signals representing the angular displacement from a reference position of a steering wheel, and signals representing a desired vehicle speed selected through a vehicle speed control system.

The traction battery pack 140 includes a current sensor to output signals indicative of a magnitude and direction of current flowing into or out of the traction battery. The traction battery pack 140 also includes a voltage sensor to output signals indicative of the voltage across the terminals of the battery. The controller 142 is further programmed to compute SOC based on the signals from the current sensor and the voltage sensor of the traction battery. Various techniques may be utilized to compute the state of charge. For example, an ampere-hour integration may be implemented in which the current through the traction battery is integrated over time. SOC may also be estimated based on the output of the traction battery voltage sensor. The specific technique utilized may depend upon the chemical composition and characteristics of the particular battery.

The engine 104 may be controlled by a powertrain control module having at least one controller in connection with the system controller 142. Controller 142 issues engine torque commands to the engine 104, in response to which engine 104 produces commanded engine output torque to propel rear wheels 112, 114. The engine torque commands may be based, at least in part, on accelerator pedal operator input and brake pedal operator input. Controller 142 may also be programmed to issue commands to activate and/or deactivate the engine 104 when entering or leaving any of the propulsion system operating modes discussed above.

The controller 142 is programmed to command wheel brake torque from a braking system, which actuates friction wheel brakes using hydraulic brake pressure to produce at least a portion of the commanded wheel brake torque. In other examples, friction brakes may be electrically actuated rather than hydraulically actuated. As discussed in more detail below, the electric machines may be individually commanded to output a regenerative brake torque to supplement vehicle braking.

The controller 142 is further programmed to issue transmission gear commands, in response to which transmission 106 engages a desired gear to produce a gear ratio corresponding to the desired gear. According to some examples, transmission 106 includes various ratio forward gears as well as reverse drive gears based on engagement and/or disengagement states of internal friction control elements. The states of the control elements combine to produce the forward and reverse gear ratios output by the transmission.

The controller 142 is also programmed to issue electric machine torque commands, in response to which the electric machines 124, 126 output the desired motor torque on respective half shafts 132, 134. As discussed above the output torque of each of the electric machines may be either positive or negative, depending on whether the particular electric machine is operated as a motor for propulsion or a generator for recovering energy. Also discussed above, since the electric machines are independently controlled, different torque output may be commanded to each of two laterally opposing electric machines.

According to aspects of the present disclosure, vehicle 100 is provided as a hybridized performance vehicle. In order to improve the fuel economy during normal driving road and improve vehicle performance during high output conditions such as race track driving, unique regenerative braking control strategies may be applied to recover energy using the electric machines even during severe braking events. More specifically, the independently-controlled electric machines can be used to supplement propulsive torque, as well as provide regenerative braking torque using unique side to side torque outputs based on operating conditions such as vehicle speed, yaw, and steering angle.

The availability of the two independent motors creates opportunities for advanced regenerative braking control. For example, when the vehicle is braking while cornering, load transfer occurs from the inner wheels to the outer wheels, making the maximum capable friction force between the tire and ground (which is proportional to the normal load) different between the inner and outer wheels. Also, when the vehicle braking occurs while driving on road surfaces having a surface friction gradient, a tire adhesion coefficient of each side, and correspondingly the maximum capable friction force between the wheels may become different from side to side. If a driving scenario causing unique wheel slip conditions is detected during a brake event, the two electric machines may be commanded to produce different regenerative braking torque output. The regenerative braking torque is independently calculated for each wheel such that the overall commanded regenerative torque does not exceed the capability of any particular wheel, preventing wheel excessive slip or lockup.

Independent regenerative torque control of separate electric machines enables more efficient energy recuperation. However, when different regenerative braking torques are applied to each side of front wheels, additional yaw moment may be introduced to the vehicle. Excessive yaw moment can degrade yaw stability of the vehicle, and cause undesired dynamic conditions such as the vehicle spinning out, drifting, and/or panic reactions from the driver. According to the present disclosure, in order to manage such vehicle dynamics challenges while still taking best advantage of independent regenerative torque control, first the combined total regenerative braking torque request for the both electric machines is determined, and second the allocation between the two independent electric machines is determined. The control solutions according to this two-layer control strategy are described in more detail below, where one control objective is to increase regenerative braking opportunities while not introducing excessive yaw moment.

A regenerative braking control scheme according to the present disclosure provides a first control layer that includes calculating a total regenerative braking torque request (i.e., the combined regenerative braking torque output applied at both wheels), which may be based on the independent braking torque limit of each particular wheel. The regenerative braking torque limit of the less capable wheel is considered as its maximum potential regenerative braking torque. The capability of a particular wheel may be determined based on at least one of a road friction condition at that wheel, electric machine regeneration capability limits, and battery SOC. Then a difference between regenerative braking torque between the two laterally-opposing wheels is controlled by a predetermined threshold based on vehicle speed and steering angle. One benefit of the first layer of regenerative braking control is to realize the maximum regenerative braking potential while avoiding the introduction of excessive yaw moment to the second layer of torque control.

The regenerative braking control scheme according to the present disclosure provides a second control layer that includes calculating the allocative split of the overall total regenerative braking torque request. The individual regenerative braking torque request for each wheel is obtained by honoring both the need for braking torque vectoring as well as the individual maximum regenerative braking torque potential based on an urgency of torque vectoring compliance. Thus, vehicle yaw rate is taken into account in the second control layer while taking advantage of different regenerative braking potential of the electric machine of each side. At the same time, since the introduction of yaw is managed at the first layer, smaller and faster regenerative braking torque adjustments are required at the second layer to achieve the desired torque vectoring and subsequent vehicle dynamics. A synergistic effect of the two layers of regenerative braking control is an improvement in regenerative braking responsiveness while providing more energy recuperation while considering vehicle's stability needs. Aspects of the present disclosure also provide a robust control architecture for regenerative braking control and torque vectoring control, as well as the interaction between the two.

The regenerative braking control schemes discussed herein may be similarly applicable to a vehicle having electric machine propulsion at all four wheels. That is, a vehicle having a first pair of electric machines coupled to laterally-opposing front wheels, and a second pair of electric machines couple to laterally-opposing rear wheels may also benefit from side to side regenerative braking torque controls of the present disclosure.

First Control Layer: Proactive Control and Selection of Total Regenerative Braking Torque.

Figure 2:
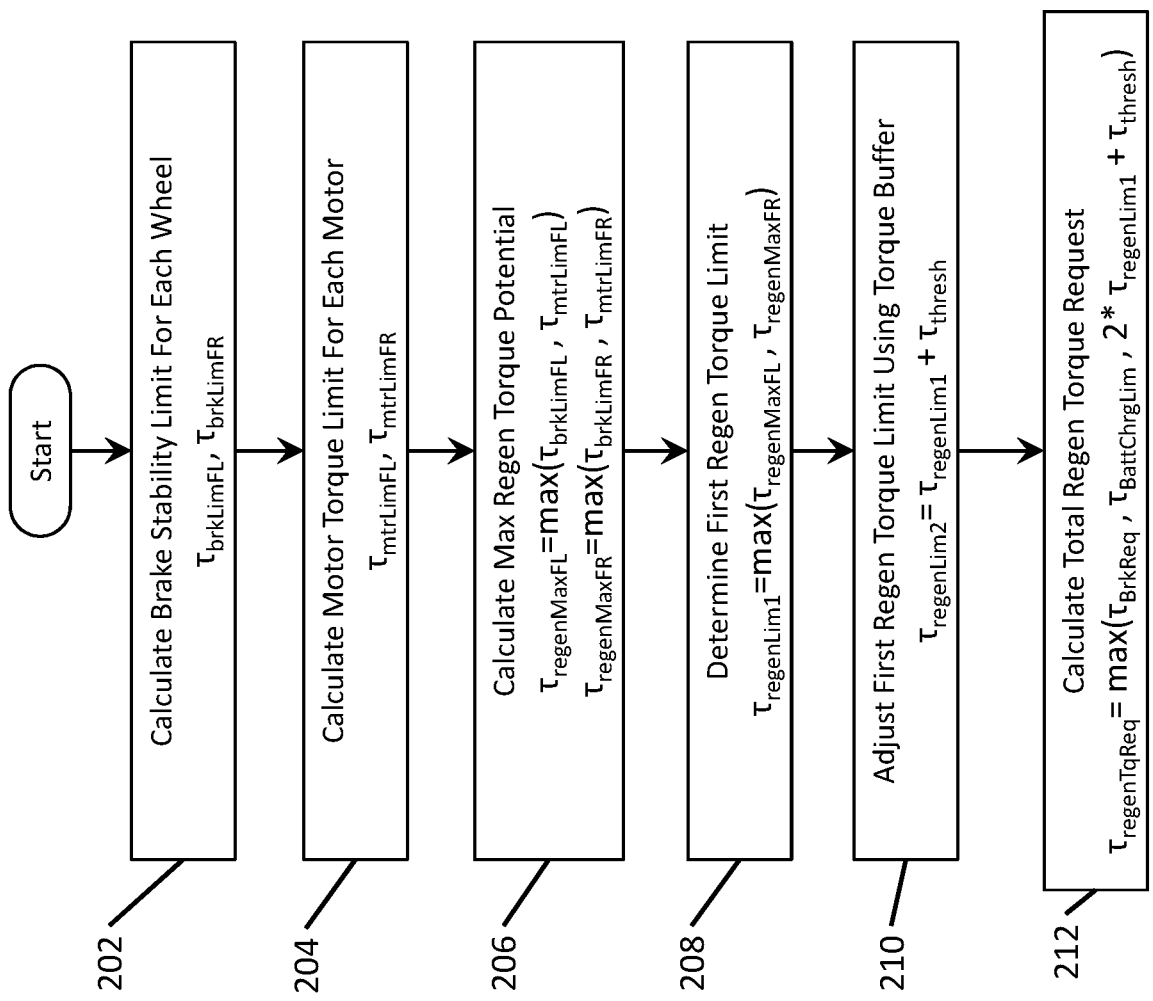
FIG. 2 is a method of controlling regenerative braking of a vehicle.

FIG. 2 illustrates an example method 200 including a control logic to obtain the total regen torque request for a vehicle regenerative braking system. The method includes monitoring the torque capability of each of a plurality of wheels, and controlling the regen torque limit difference between multiple wheels.

At step 202 the algorithm includes calculating a brake stability limit of each wheel. The brake stability limit may be considered as a torque beyond which the max capable friction torque between the tire and ground is exceeded. The limit may be used a threshold to prevent excessive wheel slip or lockup of a given wheel. The brake stability limit can be obtained by considering the driving surface coefficient of adhesion μ and normal load upon the driving surface (which may be a function of various factors such as vehicle mass, track width, height, center of gravity, as well as the vehicle's longitudinal, lateral acceleration, etc.) The braking torque is applied as a resistive torque, thus the brake stability limits may be calculated and stored in memory as negative values. According to a specific example, the controller calculates a front left wheel brake stability limit, $\tau_{brkLimFL}$ and a front right wheel brake stability limit $\tau_{brkLimFR}$.

At step 204 the algorithm includes calculating a motor torque limit for each electric machine coupled to a corresponding vehicle wheel. According to one example the motor torque limit is the mechanical torque output limit of the motor. In the case of regenerative braking the electric machines apply a resistive torque, thus the motor torque limits may be calculated and stored in memory as negative values. According to a specific example, the controller calculates a front left motor torque limit $\tau_{mtrLimFL}$ and a front right motor torque limit $\tau_{mtrLimFR}$.

At step 206 the algorithm includes calculating a maximum regenerative torque potential for each individual wheel. According to the example of FIG. 2, the maximum regenerative torque potential may be calculated as the max of the brake stability limit and the motor torque limit for each wheel. That is, the smaller torque magnitude of each of the limits may be the actual limiting factor of the regenerative torque capability for a given wheel (i.e., a braking torque limit). According to a specific example the maximum regenerative torque potential for each of the front wheels, $\tau_{regenMaxFL}$ and $\tau_{regenMaxFR}$ is calculated by equations (1) and (2) below, respectively.

$$\tau_{regenMaxFL}=\max(\tau_{brkLimFL},\tau_{mtrLimFL}) \quad (1)$$

$$\tau_{regenMaxFR}=\max(\tau_{brkLimFR},\tau_{mtrLimFR}) \quad (2)$$

At step 208 the algorithm includes assessing capability differences between the right and left wheels to determine a first regenerative torque limit. In order to enhance stability, a more capable wheel may be limited by a less capable wheel. That is, the first regenerative torque limit for the less capable wheel (e.g., $\tau_{regenLim1}$) may be set to its max regen torque potential, and a second regenerative torque limit for the more capable wheel (e.g., $\tau_{regenLim2}$) may be set to the limit of less capable wheel plus a predetermined torque buffer, $\tau_{thresh}$. The second regenerative torque limit is calculated at step 210. According to a specific example, the first and second regenerative torque limits are calculated by equations (3) and (4), respectively.

$$\tau_{regenLim1}=\max(\tau_{regenMaxFR},\tau_{regenMaxFL}) \quad (3)$$

$$\tau_{regenLim2}=\tau_{regenLim1}+\tau_{thresh} \quad (4)$$

The torque threshold $\tau_{thresh}$ may be a predetermined value stored in memory of the controller to operate as a buffer. According to one example, $\tau_{thresh}$ may be a fixed value. According to other examples, the controller may store a subroutine to calculate $\tau_{thresh}$ real-time based on vehicle operating conditions. According to further examples, the controller may store one or more lookup tables containing various threshold values. More specifically, the $\tau_{thresh}$ may be determined as a function of vehicle speed and steering angle as defined by equation (5) below.

$$\tau_{thresh}=f(\text{vehicle speed,steering angle}) \quad (5)$$

Further, the absolute value of $\tau_{thresh}$ is set to be less than a difference between the maximum regenerative torque potential, or braking torque limit, of the left and right electric machines as shown by equation (6) below.

$$|\tau_{thresh}|\leq|\tau_{regenMaxFL}-\tau_{regenMaxFR}| \quad (6)$$

Thus, the torque threshold $\tau_{thresh}$ may be indirectly related to certain aspects of vehicle motion (e.g., longitudinal/lateral acceleration, yaw rate, etc.), the threshold may be determined from readily-available input signals such as vehicle speed and steering angle as noted above. For example, the lookup table stored in memory may be arranged with vehicle speed and steering angle as inputs. And, $\tau_{thresh}$ represents an allowable difference between the less capable wheel and the more capable wheel. In this way, algorithms discussed herein are arranged to take advantage of the different regenerative torque capability of the wheels, while controlling any yaw moment introduced by the regenerative control.

At step 212, total regenerative torque request representing the sum of both wheels is calculated as an arbitration between the driver braking request (e.g., $\tau_{brkReq}$), battery charging capability (e.g., $\tau_{battChrgLim}$), and the total regenerative torque limit for each of the two driven wheels as discussed above (e.g., $2*\tau_{regenLim1}+\tau_{thresh}$). The driver braking request $\tau_{brkReq}$ is determined from the input signal from a brake pedal position sensor for example. The battery charging capability $\tau_{battChrgLim}$ may be based on various battery parameters such as state of charge, operating temperature, battery voltage limit, battery current limit, etc. According to a specific example, the total regenerative torque request $\tau_{regenTqReq}$ is determined by equation (7) below.

$$\tau_{regenTqReq}=\max(\tau_{brkReq},\tau_{battChrgLim},2*\tau_{regenLim1}+\tau_{thresh}) \quad (7)$$

Second Control Layer: Independent Regenerative Torque Control Command Selection Based on Yaw Control and Desired Torque Vectoring Referring to FIG. 3, a second layer algorithm may be applied to the regenerative torque control to further correct for any yaw conditions remaining following the first control layer algorithm discussed above. Method 300 illustrates a control algorithm to refine the split of regenerative torque commanded from each electric machine. In this case battery charge limit may be disregarded since it was considered in calculating the total regenerative torque request. Thus, in the second layer algorithm the total regenerative torque request and the maximum regenerative torque potential of each wheel are considered, and a torque vectoring torque is taken in account as well depending on the urgency of yaw control.

At step 302 the total regenerative torque request $\tau_{regenTqReq}$ is obtained, for an example according to method 200 discussed above. At step 304 the maximum regenerative torque potential of each wheel is calculated, for example also according to method 200 discussed above. At step 306 an even torque split between the two wheels (e.g., $\tau_{ReqEven}$) is applied by halving the total regenerative torque request $\tau_{regenTqReq}$.

At step 308 the algorithm includes dynamically determining whether an urgency to comply with the torque vectoring request is present. For example, the presence of urgent control compliance may be based on whether or not the actual yaw rate is close to a desired yaw rate of the vehicle. The actual yaw rate can be obtained from a measurement signal output from a yaw sensor, and the desired yaw rate can be estimated based on current vehicle speed and steering angle. According to one example, a lookup table stored in a memory of the controller includes desired yaw values based on vehicle operating conditions. In further examples, the presence of urgent torque vectoring control compliance is determined by equation (8). If the difference between the actual yaw rate and the target yaw rate is less than the predetermined yaw threshold, there may not be urgency to apply active torque vectoring.

$$|\text{YawRate}_{Actual} - \text{YawRate}_{Desired}| \le \text{Yaw}_{Threshold} \quad (8)$$

If there is no urgency to comply with the torque vectoring request, then the finalized regen torque request provided to each wheel is calculated at step 310 by comparing $\tau_{ReqEven}$ against the maximum regenerative torque potential of each wheel (i.e., $\tau_{regenMaxFL}$, $\tau_{regenMaxFR}$) without applying torque vectoring compliance control. Said another way the controller is programmed to, in response to a difference between an actual vehicle yaw rate and a target vehicle yaw rate being less than the yaw threshold, issue a regenerative braking torque command to one of the electric machines equal to about a lesser of half of the combined regenerative braking torque output and each respective laterally-opposing electric machine regenerative torque capability limit. Thus, $\tau_{regenReqFL}$ and $\tau_{regenReqFR}$ are calculated independently to maximize the regenerative braking opportunity based on an allowable difference between the wheels. According to a specific example, if $\tau_{regenReqFL}$ corresponds to the less capable wheel, then the regenerative braking torque request will be $\tau_{regenMaxFL}$ for that wheel, and $\tau_{ReqEven}$ may be commanded for the other wheel. The finalized torque requests are calculated according to equations (9) and (10) without further adjustment for torque vectoring.

$$\tau_{regenReqFL} = \max(\tau_{ReqEven}, \tau_{regenMaxFL}) \quad (9)$$

$$\tau_{regenReqFR} = \max(\tau_{ReqEven}, \tau_{regenMaxFR}) \quad (10)$$

If there is an urgent need to comply with the torque vectoring request, a torque vectoring request for each individual wheel is determined (e.g., $\tau_{vectFL}$, $\tau_{vectFR}$). Each of the torque vectoring requests is a torque delta that may be applied to $\tau_{ReqEven}$. The respective torque vectoring requests can be obtained based on the magnitude and direction of the difference between vehicle's desired yaw rate and actual yaw rate. And, the torque vectoring request for each side may have the same magnitude with opposite directions of torque adjustment according to equation (11).

$$\tau_{vectFR} = -\tau_{vectFL} \quad (11)$$

Thus, the algorithms according to the present disclosure allow a difference between the respective commands regenerative braking torque for each of the electric machines while avoiding excessive yaw. This difference is dynamically adjusted based on vehicle operating conditions and the torque vectoring that is applied to the respective wheel positions can effectively cause regenerative braking torque from each electric machine to be within a predetermined torque threshold of each other. At step 314 the individual vector-adjusted torque request for each side electric machine is calculated by applying the torque vectoring requests according to equations (12) and (13).

$$\tau_{ReqFR} = \tau_{ReqEven} + \tau_{vectFR} \quad (12)$$

$$\tau_{ReqFL} = \tau_{ReqEven} + \tau_{vectFL} \quad (13)$$

The finalized regen torque request provided to each wheel is calculated at step 316 by comparing the vector-adjusted torque requests $\tau_{ReqFL}$, $\tau_{ReqFR}$ against the maximum regenerative torque potential of each wheel (i.e., $\tau_{regenMaxFL}$, $\tau_{regenMaxFR}$). According to a specific example, the finalized torque requests are calculated according to equations (14) and (15) while accounting for the adjustments for urgent torque vectoring. Said another way, the controller is programmed to in response to a difference between an actual vehicle yaw rate and a target vehicle yaw rate being greater than the yaw threshold, issue a regenerative braking torque command to one of the electric machines equal to about the lesser of a vector-adjusted torque request and an electric machine regenerative torque capability limit.

$$\tau_{regenReqFL} = \max(\tau_{ReqFL}, \tau_{regenMaxFL}) \quad (14)$$

$$\tau_{regenReqFR} = \max(\tau_{ReqFR}, \tau_{regenMaxFR}) \quad (15)$$

At step 318, the regenerative torque commands for each individual wheel, whether generated at step 310 or at step 316, is then issued to the corresponding electric machine at a given wheel position.

According to aspects of the present disclosure, a controller is programmed to control arbitration of allocating regenerative torque to various independently-driven wheels. In some cases, the wheel having the least torque capability drives the arbitration decision. One or more other wheels having a greater torque capability may then be limited by a maximum difference in regenerative torque relative to the least capable wheel. The adjustment of regenerative torque for wheel, either with or without torque vectoring, depending on the yaw situation.

The combination of the first and second layers of the control algorithm provides a synergistic benefit in that the first layer operates as a proactive torque control to prevent excessive yaw conditions from being introduced to the second layer algorithm. The first layer of the control algorithm includes generating the total overall regenerative torque request for all of the vehicle wheels, while proactively considering variance in torque capability of different wheels. In this way, regulating the overall regenerative torque request may limit some or all excessive yaw conditions from being generated before the second layer of the control algorithm performs torque allocation between individual wheels. In effect, less frequent and/or smaller magnitude regenerative torque request adjustments may occur in second layer of the torque control algorithm. Once combined, the torque allocation methods discussed herein yield a faster, and failsafe regenerative torque determination that requires less adjustments during the second layer.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
    a pair of electric machines each coupled to a laterally-opposing wheel; and
    a controller programmed to
        command a combined regenerative braking torque output of the electric machines based on a lesser of a braking torque limit of each individual electric machine, and
        command a regenerative braking torque from each electric machine to be within a predetermined torque threshold of each other in response to a yaw rate exceeding a yaw threshold.

2. The vehicle of claim 1, wherein the braking torque limit for each of the electric machines is based on at least one of a wheel slip value associated with an individual wheel and an electric machine regenerative torque capability limit.

3. The vehicle of claim 2, wherein the combined torque output is equal to about two times the lesser of the braking torque limit corresponding to each of the electric machines responsive to a difference between an actual vehicle yaw rate and a target vehicle yaw rate being less than the yaw threshold.

4. The vehicle of claim 2 wherein a regenerative braking torque command for a first electric machine is equal to about half of the combined regenerative braking torque output plus a torque vector adjustment, and a regenerative braking torque command for a second electric machine is equal to about half of the combined regenerative braking torque output minus the torque vector adjustment.

5. The vehicle of claim 1 wherein the controller is further programmed to, in response to a difference between an actual vehicle yaw rate and a target vehicle yaw rate being less than the yaw threshold, issue a regenerative braking torque command to one of the electric machines equal to about a lesser of half of the combined regenerative braking torque output and an electric machine regenerative torque capability limit.

6. The vehicle of claim 1 wherein the controller is further programmed to, in response to a difference between an actual vehicle yaw rate and a target vehicle yaw rate being greater than the yaw threshold, issue a regenerative braking torque command to one of the electric machines equal to about the lesser of a vector-adjusted torque request and an electric machine regenerative torque capability limit.

7. The vehicle of claim 1 wherein a first pair of electric machines is coupled to laterally-opposing front wheels, and a second pair of electric machines is couple to laterally-opposing rear wheels.

8. A method of controlling regenerative braking comprising:
    applying a combined regenerative braking torque output for each of a first wheel and a second laterally-opposing wheel that is equal to about two times a lesser individual regenerative torque capability limit of the first wheel and the second laterally-opposing wheel, wherein the individual regenerative torque capability limit is based on the lesser of a wheel slip torque limit and an electric machine regenerative torque capability limit.

9. The method of claim 8 further comprising, in response to a yaw rate exceeding a predetermined yaw threshold, commanding a regenerative braking torque output for the first wheel equal to about half of the combined regenerative braking torque output plus a torque vector adjustment, and commanding a regenerative braking torque output for the second laterally-opposing wheel equal to about half of the combined regenerative braking torque output minus the torque vector adjustment.

10. The method of claim 8 further comprising commanding a regenerative braking torque output for each of the first wheel and the second laterally-opposing wheel to be equal to about the lesser of half of the combined regenerative braking torque output and the individual regenerative torque capability in response to a yaw rate less than a predetermined yaw threshold.

11. The method of claim 8 further comprising limiting the combined regenerative braking torque output based on at least one of a driver braking request and a battery charging capability.

12. The method of claim 8 further comprising, in response to a difference between an actual vehicle yaw rate and a target vehicle yaw rate being less than a predetermined yaw threshold, applying a regenerative braking torque at one of the first wheel and the second laterally-opposing wheel equal to about a lesser of half of the combined regenerative braking torque output and an electric machine regenerative torque capability limit.

13. The method of claim 8 further comprising, in response to a difference between an actual vehicle yaw rate and a target vehicle yaw rate being greater than a predetermined yaw threshold, applying a regenerative braking torque at one of the first wheel and the second laterally-opposing wheel equal to about the lesser of a vector-adjusted torque request and an electric machine regenerative torque capability limit.

14. The method of claim 13 wherein the vector-adjusted torque request includes increasing the regenerative braking torque at the first wheel by a vector torque and decreasing the regenerative braking torque at the second laterally-opposing wheel by the vector torque.

15. A vehicle regenerative braking system comprising:
    a pair of electric machines each coupled to a laterally-opposing vehicle wheel to control wheel torque; and
    a controller programmed to command a combined regenerative braking torque output at the wheels equal to about two times a braking torque limit corresponding to a lesser torque-capable wheel plus a predetermined torque buffer, and command a regenerative braking torque at each wheel to be half of the combined regenerative braking torque plus a torque vector adjustment in response to a vehicle yaw rate greater than a yaw threshold.

16. The vehicle regenerative braking system of claim 15 wherein the controller is further programmed to, in response to a vehicle yaw rate less than the yaw threshold, command a regenerative braking torque at each laterally-opposing wheel equal to about the lesser of half of the combined regenerative braking torque output and an individual regenerative torque capability corresponding to each respective laterally-opposing wheel.

17. The vehicle regenerative braking system of claim 15 wherein the controller is further programmed to in response to a vehicle yaw rate greater than the yaw threshold, command a regenerative braking torque at a first wheel equal to half of the combined regenerative braking torque plus a vector torque and command a regenerative braking torque at a second wheel equal to half of the combined regenerative braking torque minus the vector torque.

18. The vehicle regenerative braking system of claim 15 wherein the predetermined torque buffer is based on at least one of a at least one of a vehicle speed and a steering angle.

19. The vehicle regenerative braking system of claim 15 wherein the regenerative braking torque limit of each of a first electric machine and a second electric machine is based on at least one of a wheel slip value associated with each respective wheel, and an electric machine regenerative torque capability limit.

20. The vehicle regenerative braking system of claim 15 wherein a first pair of electric machines is coupled to laterally-opposing front wheels, and a second pair of electric machines is coupled to laterally-opposing rear wheels.

* * * * *